United States Patent Office 3,206,455
Patented Sept. 14, 1965

3,206,455
PROCESS FOR PRODUCING 6-(ALPHA-AMINO-ACYLAMINO)-PENICILLANIC ACIDS
Harvey E. Alburn, West Chester, Norman H. Grant, Wynnewood, and Horace Fletcher 3rd, Pottstown, Pa., assignors to American Home Products Corporation, New York, N.Y., a corporation of Delaware
No Drawing. Filed Feb. 7, 1963, Ser. No. 256,816
5 Claims. (Cl. 260—239.1)

This is a continuation-in-part of application Serial No. 175,828, filed February 26, 1962, now abandoned.

This invention relates generally to preparation of penicillins and more particularly to a novel method for preparing 6-(α-aminoacylamino)-penicillanic acids additionally substituted on the alpha carbon atom; and non-toxic salts thereof.

In U.S.P. 2,985,648 there are disclosed penicillanic acid derivatives having the formula:

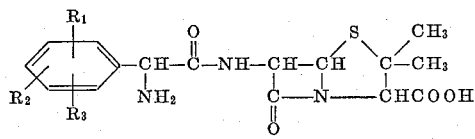

wherein $R_1$, $R_2$ and $R_3$ each represent a member selected from the group consisting of hydrogen, nitro, di(lower) alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro and trifluoromethyl; and the non-toxic carboxylic acid salts thereof, including non-toxic metallic salts such as sodium, potassium, calcium and aluminum, the ammonium salt and substituted ammonium salts, e.g., salts of such non-toxic amines as trialkylamines, including triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N-(lower) alkylpiperidine, e.g., N-ethylpiperidine and other amines which have been used to form salts with benzylpenicillin; and the non-toxic acid-addition salts thereof (i.e., the amine salts) including the mineral acid-addition salts such as the hydrochloride, hydrobromide, hydroiodide, sulfate, sulfamate and phosphate and the organic acid-addition salts such as the maleate, acetate, citrate, oxalate, succinate, benzoate, tartrate, fumarate, malate, mandelate, ascorbate, and the like.

In the above penicillanic acid derivatives, as referred to in said patent, the alpha-carbon atom of the acyl group (to which the alpha-amino group is attached) is an asymmetrical carbon atom and the compounds can therefore exist in two optically active isomeric forms [the D(—) and L(+) diastereoisomers], as well as in the optically inactive DL form, which is a mixture of two optically active forms.

As stated in U.S.P. 2,985,648, the compounds defined above are of value as antibacterial agents, nutritional supplements in animal feed; agents for the treatment of mastitis in cattle; and as therapeutical agents in poultry and mammals, including man, in the treatment of infectious diseases caused by gram-positive and gram-negative bacteria, upon either parenteral or oral administration. Moreover, the compounds show marked resistance to destruction by acids.

The 6-(α-aminoacylamino)-penicillanic acids coming within the above formula have heretofore been prepared by the method disclosed in said U.S.P. 2,985,648. This known method generally comprises reaction of 6-amino-penicillanic acid with an alpha-amino benzyl acid halide or anhydride in which the amino group has previously been provided with a protecting acyl group, such as $PhCH_2OCO$—, or some other functionally equivalent protecting group. To recover the desired alpha-amino benzyl penicillanic acid derivative, it is necessary to remove the protecting group by catalytic hydrogenation under sufficiently mild conditions to avoid destruction of the penicillin nucleus. Thus, in accordance with this known method it is necessary to proceed through four separate operational steps as follows: (1) the amino group of the amino acid reactant to be used has to be blocked with a protecting acyl group, (2) the anhydride has to be formed from the protected amino acid, (3) the protected anhydride has to be reacted with 6-aminopenicillanic acid, and then (4) the protecting group must be removed by catalytic hydrogenation to obtain the desired penicillanic acid derivative.

While, as already stated, it is known that the specific blocking group referred to above may be replaced by another functionally equivalent protecting group; in all instances heretofore disclosed, the subsequent removal of the protecting group by catalytic hydrogenation has been necessary to obtain the free 6-(α-aminoacylamino)-penicillanic acid derivative. Unfortunately for the efficient application of this prior art method, the penicillin molecule possesses a sulfur atom and, as is well known in the art, sulfur is a hydrogenation catalyst poison. This inherent characteristic of sulfur-containing molecules has made it extremely difficult to obtain pure 6-(α-aminoacylamino)-penicillanic acids in high yields by said method.

We have now discovered a novel process for the production of 6-(α-aminoacylamino)-penicillanic acids of the type described hereinbefore, whereby high yields of high purity product can be efficiently and economically obtained. With our invention, 6-(α-aminoacylamino)-penicillanic acids can be produced more efficiently than by the known process and without the need for initially introducing and finally removing the group protecting the amino group by catalytic hydrogenation.

It is a distinctive feature of our invention that the catalytic hydrogenation step which has heretofore presented so much difficulty in the preparation of 6-(α-aminoacylamino)-penicillanic acids is entirely eliminated, thus providing a more efficient, productive and economic procedure than is now known in the art. Another most important feature of the present invention is that the use of organic solvents in the reaction mixtures employed in the exercise of the method of the present invention has not only been found unnecessary, but to the contrary, most unexpectedly, it has been found that the presence of such solvents is actually detrimental to the excellent yields otherwise obtainable with our novel method. These economic advantages of the process we have discovered over the prior art makes it more likely that these penicillins will become commercially available at reasonable cost. Moreover, our novel method enables the facile production of additional categories of 6-(α-aminoacylamino)-penicillanic acids not contemplated in U.S.P. 2,985,648, as will appear hereinafter.

The process of our invention generally comprises the reaction with 6-aminopenicillanic acid of a 4-substituted-2,5-oxazolidinedione (also known as an N-carboxy amino acid anhydride), which may be additionally substituted at the 3-position and/or again at the 4-position of the ring, as defined below, in an aqueous medium having a pH of from about 3.8 to 6.2. The reaction may be represented schematically as follows:

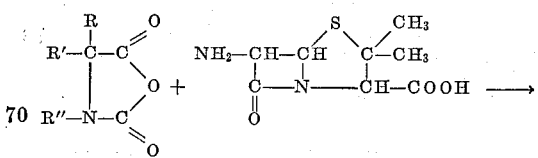

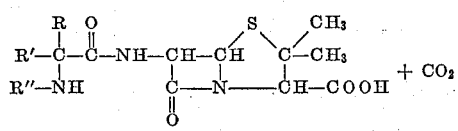

wherein R, R' and R'' each may represent a member selected from the group consisting of hydrogen, aryl, aralkyl, saturated alkyl, unsaturated alkyl, cycloalkyl, and heterocyclic radicals; R and R' may be joined to form a hydrocarbon ring; and R' and R'' may be joined to form a heterocyclic ring. R, R' and R'', when separate radicals or forming a ring as defined, may carry substituents such as those disclosed for aryl in U.S.P. 2,985,-648, and above.

The classic methods for preparing the aforesaid substituted-2,5-oxazolidinediones include (a) the carboalkoxy procedure, (b) the azide rearrangement procedure, and (c) the phosgenation procedure. These methods, of which phosgenation is preferred, have the desirable feature that they do not change the stearic configuration when an asymmetric carbon is present. The reaction for preparing the said 2,5-oxazolidinediones by phosgenation as in method (c) generally comprises the reaction of a suitable amino acid and phosgene and may be represented schematically as follows:

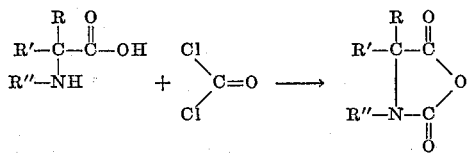

Preferably, in said phosgenation procedure, the amino acid reactant is dissolved or suspended in dioxane, phosgene is introduced into the reaction mixture, and the resulting anhydride is crystallized by the addition of an agent such as benzene.

Numerous methods for preparation of the 6-aminopenicillanic acid are now available in the art, including the methods referred to in said U.S.P. 2,985,648, and hence need not be described here. In this connection, in lieu of 6-aminopenicillanic acid, the salts thereof, such as the sodium or potassium salts, prepared in conventional manner from the acid, may be substituted in the reaction mixtures containing the selected N-carboxyanhydride. However, due to the basicity of such salts, adjustment of the reaction mixtures containing them is required to bring them within the specified pH range, else the yields obtained therefrom are undesirably diminished.

In the preferred exercise of the method of the present invention, the 4-substituted-2,5-oxazolidinedione chosen is reacted with 6-aminopenicillanic acid in approximately equimolar quantities in a cold aqueous solution in the pH range from about 3.8 to about 6.2 referred to hereinbefore and preferably in the range 4.7–5.7. The mixture is stirred for several hours at a temperature from just above the freezing point of the aqueous mixture to about 37° C., and preferably in the range 0–10° C. Although not essential, it may be preferred to include a buffer having an ionic strength of above 0.02, preferably about 0.3, to aid in keeping the reaction mixture within the required pH range. Suitable buffers for maintaining the desired pH may be any mixture of organic or inorganic water-soluble acids, bases, or salts such as sodium acetate-acetic acid, calcium acetate-acetic acid, pyridine-acetic acid, formic acid-ammonia, etc. Alternatively, the reaction mixture may be maintained within the requisite pH range by careful addition of a base such as NaOH or the like. The introduction of any substantial amount of organic solvent into the reaction mixture is specifically avoided in order to obtain the advantages of our inventive method with respect to yield and overall cost.

The surprising nature of our discovery becomes the more evident when it is noted that there has been a definite tendency of workers in the field of peptide synthesis to discourage the use of 2,5-oxazolidinediones as reagents in the reaction with amino acids, even in the preparation of small peptides, because of the tendency of the 2,5-oxazolidinediones to hydrolize and to polymerize. The consensus of these workers appears to be summarized in the statement of Greenstein and Winitz in "Chemistry of the Amino Acids," 1961, John Wiley & Sons, Inc., New York, New York, vol. II at p. 876, as follows:

"Evaluation of the Method. The general marked lability of N-carboxy amino acid anhydrides in the presence of traces of moisture, as well as the special precautions required during their controlled condensation with a suitably constituted amine, has discouraged the widespread use of these reactants in the stepwise synthesis of small peptides."

Moreover, assuming that the inventive concept involved in even employing the 2,5-oxazolidinediones as reagents in the reactions with 6-aminopenicillanic acid to obtain the desired penicillin products, has been conceived; it would then, as a matter of course, suggest itself to one skilled in the art to employ an organic solvent in the reaction mixture as necessary because of the insolubility, or at best, limited solubility of the oxazolidinedione reactants present. However, as referred to previously, we have found that, surprisingly, inclusion of such solvents significantly reduces the product yield. For example, the presence of organic solvent in the aqueous reaction medium employed in the exercise of the present invention, in amount as little as 5% by volume of said medium, has been found to cause undesirable reductions in yields.

Furthermore, in view of the unique characteristics of 6-aminopenicillanic acid our discovery is even more surprising. 6-aminopenicillanic acid will polymerize under certain conditions. In addition, it is well known that the lactam linkage present in its structure is a sensitive one. These properties would tend to suggest to skilled workers in the art that the reaction with 2,5-oxazolidinediones could not proceed to any appreciable extent without decomposition, hydrolysis, polymerization, side reactions, etc. Contrariwise, however, under the closely controlled pH, aqueous medium conditions of our invention, high yields of relatively pure product are possible.

The following examples, illustrative of our invention, are by no means to be considered limitative thereof.

EXAMPLE I

Five hundred mg. of D-4-phenyl-2,5-oxazolidinedione, 400 mg. of 6-aminopenicillanic acid, and 50 ml. of calcium acetate-acetic acid buffer (ionic strength 0.25) were stirred in an open vessel for 3 hours at 0° C. Assays of the filtrate showed 85% conversion to D-$\alpha$-aminobenzylpenicillin. The filtrate was de-ionized by stirring for 15 minutes with 17 ml. of Amberlite MB–3 resin. The solution was then freeze-dried, giving 550 mg. of white product, which assayed 83% pure by $\beta$-lactam determination.

EXAMPLE II

To a system containing 400 mg. of 6-aminopenicillanic acid and 50 ml. of sodium acetate-acetic acid buffer (ionic strength 0.1) and which was maintained at 1° C., and at a pH 4.65; there were added 100 mg. of DL-4-phenyl-2,5-oxazolidinedione every 30 minutes to a total of 500 mg. Assays before each addition showed successive conversions of 94%, 60%, 63%, 66%, and 86% (final, overall), based upon the component present in limiting amount.

EXAMPLE III

Two g. of DL-4-phenyl-2,5-oxazolidinedione, 1.6 g. 6-aminopenicillanic acid, and 200 ml. of calcium acetate-acetic acid buffer (ionic strength 0.30) forming a mixture having a pH 5.15, were stirred at 1° C. for 3 hours. The reaction mixture filtrate, when assayed against *Staph. aureus* showed 86% conversion to DL-α-aminobenzylpenicillin, using 289 penicillin G units per mg. as the standard. After salt removal by Amberlite MB-3, 99 ml. was freeze-dried, giving 1.40 g. of solid which was 70% pure by β-lactam determination and 69% pure by antimicrobial activity.

EXAMPLE IV

A system containing 2 g. of DL-4-phenyl-2,5-oxazolidinedione, 1.6 g. of 6-aminopenicillanic acid and 200 ml. of $Ca(OAc)_2HOAc$ (pH 5.18; μ 0.30) was stirred in an ice bath for 3 hours, and then filtered. The conversion to DL-α-aminobenzylpenicillin was 82% complete, judged from the filtrate potency of 3,075 penicillin G units per ml. when assayed vs. *Staph. aureus*. One hundred ninety-eight ml. of the solution were adjusted to pH 7.6 with KOH and chromatographed on a 35 x 2 cm. column of Dowex 1–X10 (sulfate form). After the passage of 222 ml., elution with 0.1 M NaOAc, pH 7.2, was begun. After the passage of an additional 250 ml., the column was washed with water. After the passage of a total of 792 ml., elution with $CO_2$-saturated water was begun. A peak of hydroxamate positive material was eluted between 930 ml.–200 ml. The fraction eluted between 930 and 1200 ml. (pH range 4.5–3.6), which omitted the trailing material, was freeze-dried and assayed. M.P. 197–220° with decomposition, $[\alpha]_D^{21}$ +213°.

*Analysis.*—Calcd. for $C_{16}H_{19}N_3O_4S \cdot H_2O$: C, 52.3; H, 5.8; N, 11.4; S, 8.7. Found: C, 53.95; H, 5.30; N, 11.78; S, 8.2.

The following antibacterial assays were made: 265 penicillin G units/mg. or 90% purity by *Staph. aureus* assay, and 83% purity by *E. coli* assay. Paper electrophoresis showed a single component.

EXAMPLE V

A D-α-aminobenzylpenicillin product, 1.75 grams, prepared as described in Example I, was suspended in 30 ml. of 0.05 M sodium acetate-acetic acid buffer of pH 3.9, stirred, filtered, adjusted to pH 7.5, and brought to a volume of 50 ml. and a sodium acetate concentration of 0.1 M. This solution was adsorbed on a 2 x 37 cm. column of polystyrene trimethylbenzyl ammonium anion exchange resin (Dowex 1–X10) in the sulfate form. After adsorption, the column was washed with 50 ml. of 0.1 M sodium acetate solution, followed by 650 ml. of water. It was then eluted with carbon dioxide-saturated water, and all hydroxamate-positive material was pooled and freeze-dried. The purity of this product, as the monohydrate, based upon hydroxamate assay of the β-lactam and using 6-amino-penicillanic acid as the standard, was 99.3%. Based upon activity against *E. coli* it was 88% pure, and based upon activity against *Staph. aureus* it was 100% pure.

EXAMPLE VI

A D-α-aminobenzylpenicillin product, 300 mg., prepared as described in Example I, was stirred with 3 ml. of water at room temperature, and the mixture was centrifuged. To the filtrate was added an amount of saturated ammonium sulfate solution to bring the overall saturation to 6.5%. The system was set at room temperature for 1 hour and at 0° for 2 hours. The precipitate, which was collected by filtration and dried in vacuo assayed 290 penicillin G units per mg. against *Staph. aureus*. It was 75% pure by hydroxamate assay and 60% pure by assay against *E. coli*. During a period of 18 hours at 0°, a crystalline precipitate formed from the mother liquor and was collected and dried. This material was 85% pure by hydroxamate assay and 100% pure by assay against *E. coli*.

EXAMPLE VII

One gram of D-4-benzyl-2,5-oxazolidinedione, 0.8 g. of 6-aminopenicillanic acid and 100 ml. of calcium acetate-acetic acid buffer, pH 5.17 and ionic strength 0.30, were stirred in an open vessel for 3 hours at 0°. The filtrate, assayed 2,590 penicillin G units per ml. against *Staph. aureus*. After desalting with Amberlite MB–3 it assayed 2,320 units/ml. The conversion mixture filtrate, when assayed against *E. coli*, showed activity equivalent to 1,460 micrograms of D-α-aminobenzylpenicillin per ml.

EXAMPLE VIII

Employing L-4-benzyl-2,5-oxazolidinedione under identical conditions as Example V, the filtrate before and after desalting assayed 735 units per ml. and 665 units per ml. The conversion mixture filtrate, when assayed against *E. coli*, showed activity equivalent to 910 micrograms of D-α-aminobenzylpenicillin per ml.

EXAMPLE IX

Following the procedure of Example I the corresponding 6-(α-aminoacylamino)-penicillin derivative is prepared by the reaction of 6-aminopenicillanic acid with the 2,5-oxazolidinedione prepared by phosgenation of the following:

Glycine
Alanine
C-allylglycine
α-Aminoisobutyric acid
β-Methylaspartic acid
S-benzylcysteine
Gamma-ethylglutamate
Gamma-methylglutamate
O-acetylhydroxyproline
O-tosylhydroxyproline
Isoleucine
Leucine
2,5-diacetoxyphenylalanine
3,4-diacetoxyphenylalanine
Epsilon-tosyllysine
Methionine
Norleucine
p-Nitrophenylalanine
Proline
O-acetylserine
O-benzylserine
O-acetyltyrosine
Valine
1-benzylhistidine
Tryptophan
1-aminocyclopentanecarboxylic acid
1-aminocyclohexanecarboxylic acid
1-aminocycloheptanecarboxylic acid For all of the amino acids listed, with the exceptions of glycine, α-aminoisobutyric acid, and the last three, the D-, L- or Dl-forms can be prepared.

EXAMPLE X

A mixture of 500 mg. of D-phenylglycine-N-carboxyanhydride, 400 mg. of 6-aminopenicillanic acid and 50 ml. of water, with an initial pH of 3.5 was stirred at 2° C. and brought to pH 5.1 by the addition of 0.3 ml. of 1 M NaOH. During 3 hours of stirring, the pH was maintained between 5.0 and 5.2. The mixture was filtered, and assay of the filtrate against *Staph. aureus* 209P showed 5,130 penicillin G units per ml., showing 88% conversion to D-α-aminobenzylpenicillin.

EXAMPLE XI

Following the general procedure described in Example X above, a series of runs was performed utilizing the reactants, amounts, aqueous reaction media, and pH conditions set forth in Tables A, B and C below, to obtain the percent conversions to penicillin products as also given therein:

Table A

1 MILLIMOLE EACH OF D-ΦGLY NCA AND Na-6-APA IN 25 ML

[45 minutes, magnetic stirrer]

| Percent acetone (v./v.) | pH | Percent conversion |
|---|---|---|
| 0 | 4.8 (adjusted) | 52 |
| 0 | 6.8 (unadjusted) | 14 |
| 5 | 6.7 (unadjusted) | 12 |
| 10 | 6.6 (unadjusted) | 10 |
| 25 | 6.5 (unadjusted) | 7 |
| 50 | 6.6 (unadjusted) | 10 |

D-φgly NCA = The N-carboxyanhydride of D-phenylglycine (D-4-phenyl-2,5-oxazolidinedione).

Table B

2 MILLIMOLES EACH OF D-φGLY NCA AND Na-6-APA IN 50 ML.

| Percent dioxane (v./v.) | pH | Percent conversion |
|---|---|---|
| 0 | 4.8 (adjusted) | 40 |
| 0 | 6.8 (unadjusted) | 17 |
| 5 | 6.4 (unadjusted) | 16 |
| 10 | 6.2 (unadjusted) | 11 |
| 25 | 6.3 (unadjusted) | 7 |
| 50 | 6.8 (unadjusted) | 4 |

Table C

1 MILLIMOLE EACH OF D-φGLY NCA AND 6-APA IN 25 ML.

| Percent dioxane | pH | Percent conversion |
|---|---|---|
| 0 | 4.8 (adjusted) | 41 |
| 0 | 3.9 (unadjusted) | 26 |
| 5 | 4.0 (unadjusted) | 16 |
| 10 | 3.9 (unadjusted) | 18 |
| 25 | 4.0 (unadjusted) | 16 |
| 50 | 4.4 (unadjusted) | 5 |

The foregoing demonstrates the surprisingly superior results obtained when organic solvent is omitted from, or is present in only a minimum proportion of, the aqueous reaction media, and the latter is maintained within the pH range as defined hereinbefore.

We claim:

1. The process for producing 6-(α-aminoacylamino)-penicillanic acid compounds which comprises reacting, in an aqueous acidic medium at a pH of from about 3.8 to about 6.2, at a temperature from just above the freezing point of the aqueous mixture to about 37° C., and in the absence of any substantive amount of an organic solvent, 6-aminopenicillanic acid with a 2,5-oxazolidinedione having the formula:

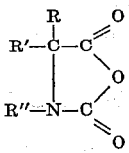

wherein R represents a member of the group consisting of hydrogen and lower alkyl; R' represents a member of the group consisting of hydrogen, (lower)alkyl, (lower)alkenyl, benzylmercapto(lower)alkyl, (lower)alkanoyl-(lower)alkyl, diacetoxyphenyl(lower)alkyl, tosylamino(lower)alkyl, (lower)alkylmercapto(lower)alkyl, nitrophenyl(lower)alkyl, alkanoyl(lower)alkyl, O-benzyl(lower)alkyl, acetoxyphenyl(lower)alkyl, N-benzylimidazolyl(lower)alkyl, indolyl(lower)alkyl, (lower)cycloalkyl, phenyl, and phenyl substituted at from 1 to 3 positions by a member of the group consisting of di(lower)alkylamino, (lower)alkanoylamino, (lower)alkanoyloxy, (lower)alkoxy, sulfamyl, halo, and trifluoromethyl; R and R', when joined together complete a ring that is (lower)cycloalkyl; R" represents hydrogen and when joined with R' completes a ring of the group consisting of pyrrolidine, (lower)acetoxypyrrolidine, and tosyloxypyrrolidine.

2. The process of claim 1 wherein a buffer is included for maintaining the medium within the stated pH range.

3. The process of claim 2 wherein the pH range is from 4.7 to 5.7.

4. The process of claim 1 wherein the 2,5-oxazolidinedione is 4-phenyl-2,5-oxazolidinedione.

5. The process of claim 1 wherein the 2,5-oxazolidinedione is 4-benzyl-2,5-oxazolidinedione.

References Cited by the Examiner

UNITED STATES PATENTS 3,080,356  3/63  Catlin _____ 260—239.1

OTHER REFERENCES

Hackh's Chemical Dictionary, page 21 (1937), second edition.

Morton: The Chemistry of Heterocyclic Compounds, page VI of the preface (1946).

NICHOLAS S. RIZZO, *Primary Examiner.*